United States Patent Office 3,549,610
Patented Dec. 22, 1970

3,549,610
METHOD OF COLLECTING PROTEIN SUBSTANCES HAVING BIOLOGICAL ACTIVITY WITH RESPECT TO THE NERVOUS SYSTEM COMPRISING EXTRACTION OF PROTEIN FROM SUBMAXILLARY GLANDS WITH AMMONIUM SULFATE OR SODIUM SULFATE
Masaaki Yamamoto, 1198 Kamiodanaka, Kawasaki-shi, Kanagawa-ken, Japan, and Tsuneyuki Nakazawa, 2–443–8 Amanuma, Omiya-shi, Saitama-ken, Japan
Continuation of application Ser. No. 531,001, Mar. 1, 1966. This application June 19, 1969, Ser. No. 838,025
Claims priority, application Japan, Mar. 3, 1965, 40/12,278
Int. Cl. C07g 7/00
U.S. Cl. 260—112          28 Claims

ABSTRACT OF THE DISCLOSURE

A process for the recovery of protein substances having a biological activity to promote the growth and development of the nervous system by the fractional precipitation from animal gland extracts, which process comprises
 (a) extracting the submaxillary glands of large animals selected from the group consisting of bovine, equine, and swine with an aqueous extracting agent;
 (b) recovering a fractional precipitate containing the protein substance by precipitating the protein substance from the extracted solution of (a) by a precipitating procedure selected from
  (1) adding a water-soluble inorganic salt other than a zinc salt to the extracted solution of (a) in a concentration of 50–70% saturation;
  (2) adding a water-soluble zinc salt to the extracted solution of (a) in a mol concentration of zinc within the range of 0.0067–0.014;
  (3) adding organic acid or a salt on an organic acid to the extracted solution of (a) in a concentration of 1–2% by weight, based on the weight of the total solution; and
  (4) adding water-soluble organic solvent to the extracted solution of (a) in a concentration of 40–50% by volume based on the volume of the total solution;
 (c) collecting the precipitate of (b);
 (d) dissolving the collected precipitate of (c) in an aqueous medium; and
 (e) repeating one or more precipitating procedures selected from (1), (2), (3), and (4) above with collection and dissolving of the collected precipitate after each intermediate precipitating procedure.
The products produced by such process having biological activity to promote the growth and development of the nervous system are also embraced.

This application is a continuation of Ser. No. 531,001, filed Mar. 1, 1966, now abandoned.

This invention relates to a method of collecting from the submaxillary glands of large animals protein substances which possess biological activity with respect to the nervous system (hereinafter referred to as active substances).

In the past, numerous biologically active substances, for example, substances which promote the growth and development of the nervous system have been found in the various organs of rodents such as, say, mouse and in snake venom.

For instance, in Levi-Montalcini: "Regional Neurochemistry," Pergamon, New York, p. 362 (1960) and S. Gohen: Proc. Natl. Acad. Sci., U.S., 46, 302 (1960), it is disclosed that biologically active substances are extracted from either mouse submaxillary glands or snake venom, and that the active substances are proteins which possess moreover unique biological activities.

There is however a statement at p. 377 of the aforementioned "Regional Neurochemistry" that this nerve-growth promoting factor was not detected at all in the submaxillary glands of the large animals, such as bovine. And in accordance with the hitherto commonly held view in the field of biology, the presence of such active substances in the various organs of large animals such as particularly bovine, equine and swine, was held to be highly improbable.

However, when, in accordance with the conventional methods, mouse submaxillary glands and snake venom are used as the raw materials, much difficulty is encountered in employing the aforesaid active substances clinically, since the source of the foregoing raw materials are extremely restricted.

It is therefore a primary object of the present invention to provide a method of collecting from readily available and low-cost raw materials protein substances which possess biological activity with respect to the nervous system.

Another object of this invention is to provide a method whereby protein substances having biologically active effects can be obtained from the submaxillary glands of large animals, particularly bovine, equine or swine, by removing the large amount of mucoid present therein and hence making it possible to obtain the protein substances with high purity and moreover in relatively large amounts on a commercial scale.

A further object of this invention is to provide protein substances having pronounced therapeutic effects on such disorders of the nervous system as peripheral neuropathy, neuralgia, neuritis, introxications neuropathy, cerebrovascular disease, demyelating disease, myelitis, cervical spondylosis and migraine.

An additional object of the invention is to provide a method of administering the aforesaid protein substances to the human body.

Other objects and advantages of this invention will be apparent from the following description.

The foregoing objects are attained in accordance with the present invention by a method of collecting protein substances having biological activity with respect to the nervous system, which comprises extracting with an aqueous extracting agent the submaxillary glands of large animals, inclusive of bovine, equine and swine, adding to this extraction solution a protein precipitant which can reversibly redissolve the precipitate to deposit as a precipitate a fraction consisting predominantly of said protein substances having biological activity with respect to the nervous system, and thereafter isolating from said solution said substances which have been substantially purified.

The important feature of the present invention resides in the unexpected discovery of the fact that protein substances which could promote the growth and development of the nervous system were present in relatively large amounts in the submaxillary glands of large animals such as bovine, equine and swine, which heretofore was considered as not containing these active substances.

On the other hand, a considerably large amount of mucoid is also present in the submaxillary glands of these large animals, for example, an amount so large as to exceed 100 times that of the active substances. Owing to the presence of this large amount of mucoid, the isolation of the active substances cannot possibly be accomplished even though the conventional method of extracting the nerve growth promoting factor from the mouse submaxillary glands or snake venom is employed.

In spite of this fact, we also unexpectedly found that when the extracting procedure to be hereinafter fully described is employed, the complete separation of the protein substances having biological activity with respect to the nervous system, from the aforesaid large amount of mucoid could be achieved.

PREPARATION OF THE AQUEOUS EXTRACTION SOLUTION FROM SUBMAXILLARY GLANDS

According to the present invention, the submaxillary glands of large animals, particularly bovine, equine or swine, are used as the raw material. In general, it is preferred that the submaxillary gland material to be used is in a fresh condition. Much difficulty is however involved in collecting fresh submaxillary glands when they are to be collected in large amounts on a commercial scale. In the preferred mode of operating this invention, purified active protein substances, as hereinafter described, can be prepared even from submaxillary glands which have been stored for a long period of time. Hence, according to this invention, the freshness of the submaxillary glands to be used is not of great concern.

Submaxillary glands, which have been collected from the carcasses of large animals, after having been removed of their fatty and other tissues, are rubbed and ground and thereafter extracted by using as the aqueous extracting agent either water or a dilute aqueous solution of an inorganic salt such, for example, as a saline solution of a concentration of 2% by weight. The insoluble matter is then removed. Any of the known extracting procedures customary in the art can be used. In this case, it is preferred that the extracting agent be used in an amount which is from three to five-fold that of the submaxillary glands on a weight basis and that the pH of the aqueous extracting agent is 7.0 to 8.0. The so obtained extraction solution contains a small amount of the active protein substances and a large amount of mucoid, for example, from 100 to 500-fold that of the active protein substances. Hence, in accordance with this invention, the protein substances consisting predominantly of the active substances and the large amount of mucoid are separated from the extraction solution by the following fractional operation.

SEPARATION FROM THE EXTRACTION SOLUTION OF THE PROTEINS CONSISTING PREDOMINANTLY OF THE ACTIVE SUBSTANCES

In order to separate the large amount of mucoid and the proteins consisting predominantly of the active substances, which are contained in the foregoing extraction solution, one of the following operations is generally employed, the fraction of the aforesaid protein substances being collected from the extraction solution as a precipitate.

(A) The proteins consisting predominantly of the active substances are selectively deposited as a precipitate, while the mucoid remained in the solution.

(B) The mucoid is first deposited as a precipitate and removed following which the proteins consisting predominantly of the active substances are collected from the remaining extraction solution as a fractional precipitate.

Therefore, the term, "protein precipitant," as used herein and in the appended claims, is meant to refer to a precipitant which is capable of precipitating the proteins without denaturing them permanently and moreover has the actions described in (A) and (B), above. As such a precipitant, included are a wide range of water-soluble inorganic salts, certain of the organic acids and the water-soluble organic solvents. Suitable protein precipitants are the sulfates represented by such as ammonium sulfate, sodium sulfate and magnesium sulfate, the water-soluble zinc salts such as zinc chloride and zinc acetate, the organic acids represented by such as sulfosalicylic acid, and the water-soluble organic solvents such as acetone and alcohol.

For purpose of illustration, typical protein precipitants having the aforesaid actions of (A) and (B) will be described below.

(A) Zinc chloride is added to the extraction solution in an amount such that the concentration of the zinc chloride in the solution does not exceed 0.02 mol, and preferably a range between 0.0067 and 0.014 mol. In this case, the active protein substances form a complex with the zinc salt. Now, if, as required, a water-soluble organic solvent such as acetone or alcohol is added to this system, the zinc complex is readily precipitated. On the other hand, since the large amount of mucoid remains in the solution without binding with the zinc salts, the separation of the two components can be readily accomplished. The conjoint use in this case of such water-soluble solvents as acetone or alcohol is particularly desirable for accelerating the precipitation of the zinc complex and for reducing the amount of the zinc salt to be used and facilitating the redissolution of the zinc complex.

According to this mode, there is the advantage that the separation and removal of the mucoid can be effectively carried out even when submaxillary glands which have been stored over a long period of time are to be used as the raw material. The reason is that in the case of such stored submaxillary glands the mucoid is denatured and hence in a state that precipitation thereof does not readily take place. Consequently, it becomes difficult to eliminate the mucoid from the extraction solution in advance. However, when the procedure here described is employed, the proteins consisting predominantly of the active substances are deposited as a zinc complex precipitate and thus the admixture of mucoid in the product is very small.

(B) First, when ammonium sulfate is added to the extraction solution and the concentration of the salt in the solution and its pH are maintained between a certain range, a major portion of the mucoid in the solution is precipitated, and the proteins consisting predominantly of active substances remain in the solution. In the case of ammonium sulfate, the salt concentration of the solution is, in general, preferably below 24% by weight (below 0.5 saturation). The pH range suitable for precipitating the mucoid in the solution will vary depending upon the class of the submaxillary glands used and operating conditions. Generally, in the case of that of bovine or equine, the mucoid precipitates between pH 7.0–7.5 and in the case of swine, between pH 4.0–4.5. Alternatively, in the case of an extraction solution of the submaxillary glands of swine, the mucoid can be removed by an operation consisting of adding the ammonium sulfate, adjusting the pH to 6.5–7.0, then adding an organic solvent such as acetone or the like and eliminating the clots of the mucoid, and thereafter decanting the bottommost layer of the three layers of the solution formed when it is allowed to stand.

When to the extraction solution from which the mucoid has been so removed ammonium sulfate is again added and the salt concentration of the solution is increased, proteins consisting predominantly of the active substances are precipitated. It is preferred that the concentration of the ammonium sulfate in the solution at this time be about 33% by weight (0.7 saturation). In this manner, the fraction of proteins consisting predominantly of the active substances can be isolated as a fractional precipitate in a concentration of the ammonium sulfate from 0.5 to 0.7 saturation in the solution.

Numerous other inorganic salts besides those mentioned above can be used as the protein precipitant. While the concentration of the salt used will vary depending upon the kinds of the salt, the range of concentration for precipitating only the fraction of the proteins consisting predominantly of the active substances can be determined readily on the basis of a simple experiment. It is possible to use as the protein precipitant the water-soluble organic solvents such as alcohol and acetone and organic acids, such as sulfosalicylic acid, in the form of their sodium salts. For example, the fraction of the proteins consisting predominantly of the active substances can be collected as a precipitate by adding either alcohol or acetone such that the concentration thereof in the solution becomes 30–50% by volume. Alternatively, by adding sulfosalicylic acid to the extraction solution such that the concentration thereof in the solution becomes 1–2%, the fraction of the active substances can be similarly collected as a precipitate between pH 3–4. The organic solvents are however preferably used as a precipitant along with the aforesaid inorganic salts, or as a precipitant when the protein fraction consisting predominantly of the active substances, after having been precipitated by the addition of the inorganic salt or organic acid, are again subjected to fractional precipitation.

According to this invention, the so obtained precipitate is again dissolved in an aqueous medium. This aqueous medium may be either water, an aqueous solution of an inorganic salt of pH 3 to 10, or an aqueous solution containing a dissociating agent of the protein-inorganic salt complex. When an organic solvent, organic acid or inorganic salt is used as the protein precipitant, the resulting precipitate can readily be dissolved in water or the foregoing aqueous solution of an inorganic salt. On the other hand, when a protein complex forming agent, such as a water-soluble zinc salt, is used as the protein precipitant, a dissociating agent, such as ethylene diamine tetraacetic acid, an alkali metal salt of citric acid or glycine, is used for redissolving the resulting precipitate.

Needless to say, the purity of the active protein substances can be enhanced by repeating the hereinabove-described operation for at least two times. Further, this is most convenient for the preparation of protein substances having biological activity with respect to the nervous system of high potency. For example, in the case where the aforesaid precipitate still contains a considerable amount of mucoid or impure proteins, a water-soluble organic solvent such as acetone is added as a precipitant to the redissolved solution, and a fractional precipitate of an acetone concentration in the solution of below 50% by volume is collected. When an inorganic salt such as ammonium sulfate has been used as the precipitant in this case, it is preferred that the ammonium sulfate be eliminated by means of such as dialysis prior to adding the acetone to the redissolved solution.

On the other hand, when submaxillary glands which have been stored for a long period of time are to be used, protein substances consisting predominantly of the active substances of still greater purity can be obtained by the following procedure. First, a zinc salt such as zinc chloride is added as a precipitant to the extraction solution, then the resulting zinc complex is redissolved, followed by the addition of ammonium sulfate to the solution of the redissolved zinc complex to deposit a precipitate, and thereafter dialyzing this precipitate, after which acetone is added as a precipitant to the dialyzate solution, thereby obtaining the proteins consisting predominantly of the active substances.

ISOLATION OF THE ACTIVE SUBSTANCES FROM THE PROTEINS CONSISTING PREDOMINANTLY OF THE ACTIVE SUBSTANCES

From the solution containing proteins consisting predominantly of the active substances from which mucoid has been substantially eliminated, as hereinabove described, the substantially purified active substances are isolated by any of the optional means. According to this invention, a particularly preferred procedure consists of adding a water-soluble organic solvent, such as alcohol or acetone, to the aforesaid solution and collecting the fractional precipitate with acetone in the concentration between 40% and 50% by volume in acetone concentration of the total volume of the solution. This is because the protein substances having biological activity precipitate at the acetone concentration between 40% and 50% by volume, whereas the other proteins either precipitate at below 40% by volume or remain in the solution.

Thus, substantially purified protein substances having biological activity with respect to the nervous system can be obtained according to this invention. These substances can be used, as such for such disorders of the nervous system as peripheral neuropathy, neuralgia, neuritis, intoxications neuropathy, cerebrovascular diseases, dymyelating disease, myelitis, nervous disturbances in accompanying with osteopathy, cervical spondylosis, migraine and other disturbances and disorders of the nervous system.

According to our studies, it was found however that the electrophoretic pattern of these active substances showed that they were made up principally of two components having different mobilities. For selectively separating these two components, the fractional precipitation by means of acrinol is effective. Namely, the aforesaid protein substances obtained by the fractional precipitation with acetone are dissolved in a saline solution, and a weakly basic aqueous acrinol solution is added gradually in increment to the foregoing solution while separating the forming precipitate, the addition of the acrinol solution being such that the weight ratio of the protein to acrinol becomes finally 4:1. Thus, by fractionating this solution into a mother liquor containing a protein substance (fraction S) which is especially effective with respect to the growth of neurons and the regeneration of axons and a precipitate consisting of an acrinol complex of a protein substance (fraction F) effective with respect to the proliferation of the glial cells, it is possible to separate the active substances into the foregoing protein substance (S) and protein substance (F).

The active substances, which have been collected from the submaxillary glands of the large animals such as bovine, equine or swine, have been purified to a high degree in the hereinbefore-described purification process, but for attaining still greater homogeneity, they are caused to be absorbed to the two ion exchange agents of CM-cellulose or DEAE-cellulose in a low concentration of salt and are eluted within a specific pH range by raising the salt concentration. Thus can be obtained active substances which have been homogenized to a high degree.

PROPERTIES OF THE ACTIVE PROTEIN SUBSTANCE

Both active substances (S) and (F), which have been so separated, have biological activity with respect to the nervous system, and it was found that the substance (S) was particularly effective for promoting the growth of the nerve cells and regeneration of the axons, while substance (F) exhibited pronounced effects in promoting the proliferation of the glial cells.

The purified active substances, both (S) and (F), obtained by the invention method exhibit the usual protein color reaction, their maximum absorption being at 279 m$\mu$ and 278 m$\mu$, respectively. They are nondialytic, are decomposed by proteolytic enzymes, and are unstable to heat. It is thus clear that they possess the properties of protein. They are judged to be practically a single component from analysis by electrophoresis and gas chromatography and their purity is high. The yield of the active substance (S) from the glands varies somewhat depending upon the animal from which the submaxillary glands are obtained, but is roughly a value of 100–200 mg. per kg. of the glands. In the case of bovine, it is 120–150 mg. per kg. of submaxillary glands; in the case of swine, 100–120 mg. and in the case of equine, 150–200 mg. On the other hand, the yield of the active substance (F) is 500 mg. per kg. of submaxillary glands, a comparable yield being obtained in the case of swine and equine.

By way of illustration, the physical and chemical properties of the homogeneous active substances (S) and (F) obtained from bovine are shown in Table I, below.

TABLE I
[Physical and chemical properties of bovine S-fraction and F-fraction]

| | S-fraction | F-fraction |
|---|---|---|
| Homogeneity: | | |
|   Electrophoresis | Homogeneous (pH 4.0 and pH 8.6) | Homogeneous. |
|   Ultracentrifugation | Homogeneous (pH 8.6) | Do. |
| Sedimentation coefficient | $S_{20,w} = 5.2 \times 10^{-13}$ | |
| Diffusion coefficient | $D_{20,w} = 6.0 \times 10^{-7}$ | |
| Molecular weight | $M.W_{SD} = 84,000$ | |
| Ultraviolet absorption | 279 mμ (280/260 absorption ratio=1.53) | 278 mμ (ratio=1.60). |
| Isoelectric point | pH 6.4 | pH 5.0. |
| Sugar content | Negligible | Negligible. |
| Phosphorus content | 0.2% | 0.1%. |
| Protein color reaction | (+++) | Negligible. |
| Lipoprotein color reaction | Negligible | Do. |
| Susceptibility for protease | Hydrolyzed, loss activity | Loss activity. |
| Antigenic action | (++) | (+). |

The active protein (S) which is obtained by the invention method differs from the Nerve Growth Promoting Factor which Levi extracted from the mouse submaxillary glands in the point that the molecular weight of the latter is 44,000 whereas that of the former is 84,000, a figure about twice as large.

The preparations from the submaxillary glands of bovine or equine of a blood serum phosphorus reducing substance and a parotinlike substance having the property of reducing the blood serum calcium have been known hitherto (for example, Japanese patent application publication Nos. 4,747/1957 and 4,598/1957). However, the isoelectric points of the foregoing substances are 4.5 and 5.4, respectively, whereas the fraction-F of the active substances of this invention, as is apparent from the foregoing table, has an isoelectric point of 6.4, while the fraction-S has that of 5.0. Hence, it is clear that the two differ as protein substances. In addition, their biological activities also differ entirely. Furthermore, in the above methods either the fractional precipitates at the alcohol concentrations from 60% to 80% by volume or the isoelectric point precipitate at pH 4.5 or 5.4 is being collected, whereas in the present invention when alcohol or acetone is used as the precipitant, the collection of the precipitate is made at a concentration of these precipitants of below 50% by volume. And not only the active substances are not deposited as an isoelectric point precipitate as noted hereinabove, but also when inorganic salts are used as the precipitant, their use is made with their pH in the neighborhood of neutrality. Therefore there is a definite difference in the extraction methods themselves between the foregoing published methods and those of this invention.

THE BIOLOGICAL EFFECTS ON THE NERVOUS SYSTEM OF THE ACTIVE SUBSTANCES

The powders of the active substances so obtained possess the effects of promoting to a marked degree the growth of the nerve cells, regeneration of the axons and proliferation of the glia cells.

(A) The effect of active substance (S)

When active substance (S) was added to a culture fluid in a tissue culture method with such tissues as spinal ganglia, spinal cord and brain stem from chicken embryo and the promotive effect of the growth of the nerve tissues was examined, using the axon length as the index, it can be seen that, as shown in Table II, below, with a 48–72 hour culture the growth of the axons of the spinal ganglia is promoted 2–3.5 times as compared with the control.

TABLE II.—EFFECT ON THE NERVOUS SYSTEM OF PURIFIED POWDER EXTRACTS OF VARIOUS CLASSES OF SUBMAXILLARY GLANDS
[Short term culture]

| | Spinal ganglion | | Spinal cord | | Brain stem | |
|---|---|---|---|---|---|---|
| Submaxillary gland | Optimum concentration, γ/ml. | Axon growth, μ | Optimum concentration, γ/ml. | Axon growth, μ | Optimum concentration, γ/ml. | Axon growth, μ |
| Bovine | 6.2 | 3,500 | 6.2 | 2,750 | 2.5 | 325 |
| Equine | 6.2 | 3,000 | 50 | 1,900 | 6.2 | 2,409 |
| Swine | 50 | 5,500 | 6.2 | 1,750 | 100 | 2,000 |
| Mouse* | 12.5 | 2,000 | 6.2 | 1,750 | 50 | 2,250 |
| Control** | | 1,500 | | 2,000 | | 2,000 |

\* Extracted mouse submaxillary glands by the conventional method.
\*\* The culture fluid alone without the addition of the active substance.

Thus, it is seen from Table II, above, that (1) Active substance S obtained from any source according to this invention has the effect of promoting the growth of the peripheral sensory ganglia rather than the central spinal cord and brain stem; and (2) According to the culture method, the growth promoting effect of the active substance obtained by the method of this invention far surpasses that of the mouse NGF obtained by the prior Cohen method. Further, in the case of the metabolic promoters including vitamins, their effect on axon growth is inferior and they cannot attain in a short period of time an effect which is lasting for a long period as in the case with the active substance S of this invention.

Again, when the nerve cells are cultivated for a long period of time and the effect of preventing the degeneration and disintegration of the neurons is examined, it can be seen, as shown in Table III, that active substance S had the effect of preventing the increase in the degeneration of the nerve cells at the end of one as well as two weeks of cultivation. Thus, it is seen that it has the effect of maintaining the nerve cells in a sound state.

TABLE II.—EFFECT ON THE NERVE CELLS OF PURIFIED ACTIVE SUBSTANCE IN THE CASE OF LONG TERM CULTURE

| | Control (unadministered) | | Purified active substance administered (bovine, swine, equine) | |
|---|---|---|---|---|
| Culture period, wks. | Normal neurons, percent | Degenerated neurons, percent | Normal neurons, percent | Degenerated neurons, percent |
| 1 | 65 | 35 | 88 | 12 |
| 2 | 40 | 60 | 57 | 43 |

Amount administered: 25γ/ml.

(B) Effect of active substance (F)

Figure 1A:
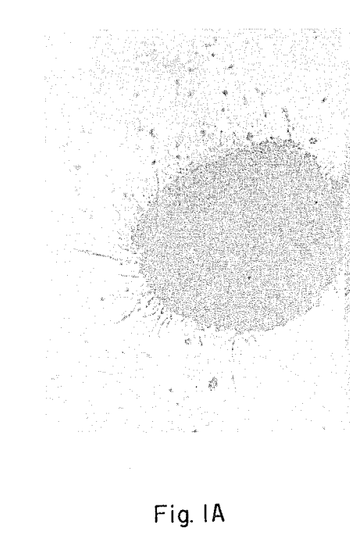
Figure 1B:
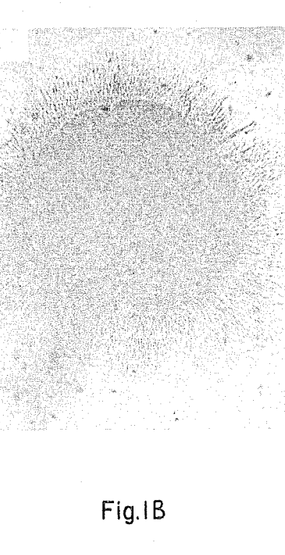
Figure 1C:
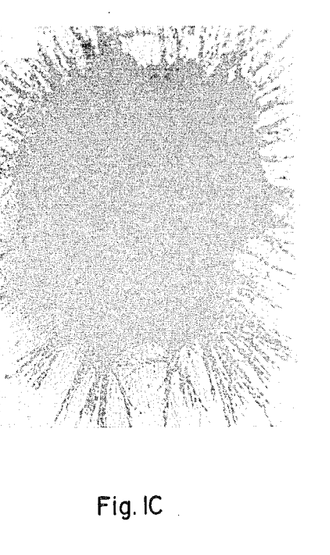

(1′) When, as in the case of the fraction-S, the fraction-F was added to the culture of the sensory nerve ganglia of chicken embryo, there was observed, as seen in FIG. 1–C, a marked convergence of Schwann cells takes place as compared with the control FIG. 1–A and fraction-S (FIG. 1–B).

Figure 2:
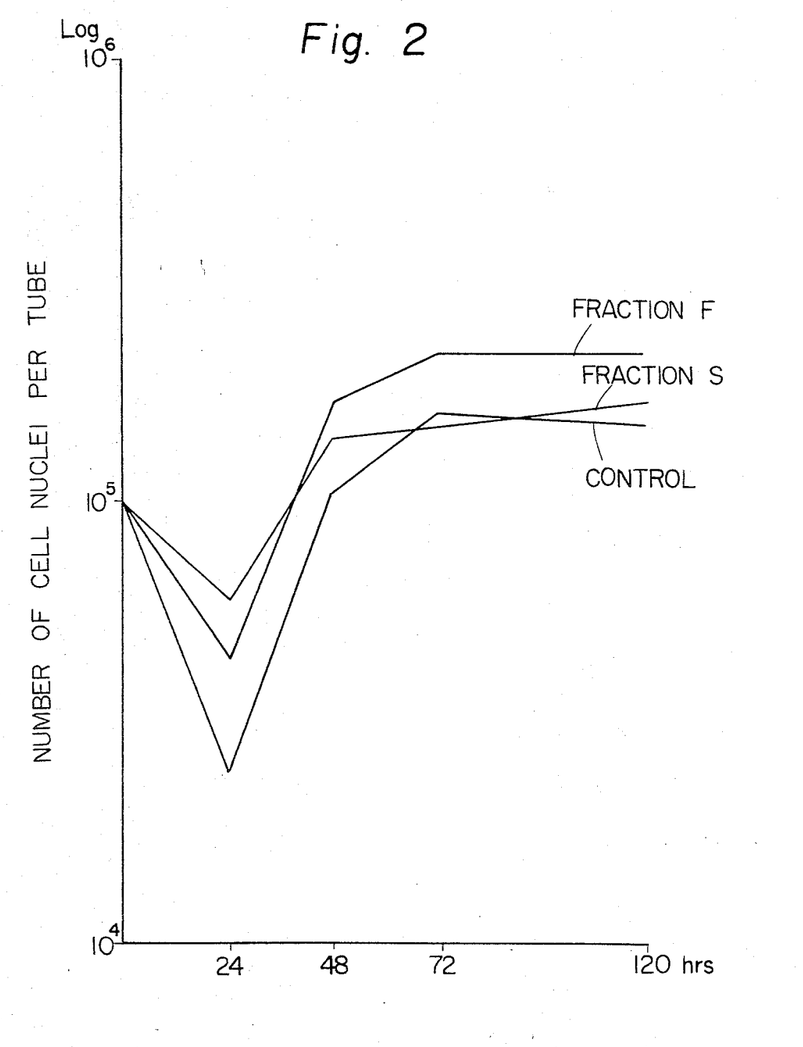

(2′) In order to confirm this, fraction-F and fraction-S were respectively added to neuroglia cell-line formed from rat cerebellum, and the proliferation of glial cells was observed. FIG. 2 shows a comparison of the effect on the proliferation of the glial cell-line among the fraction-S and fraction-F. As is seen in FIG. 2, the proliferation of the glial cells by means of fraction-F was more pronounced than in the case of the control and the fraction-S.

It was thus found that fraction-F has a biological action which is promotive with respect to neuroglia cells and that when considered in conjunction with the hereinafter described experiments in vivo, it also has good effects in promoting the re-formation of myelin.

The results obtained in vitro as described hereinbefore have been confirmed by in vivo experiments. After the sciatic nerves of a total of 129 rabbits were severed (the nutritional rami leading thereto being also severed as much as possible), they were sutured, after which the process of regeneration was studied by means of a myograph.

The foregoing group of adult rabbits each weighing 1.5 kg. was divided into three groups, i.e., a control group, an active substance (S) group and an active substance (F) group, to which a dosage of 0.2 mg/wad was intravenously administered from the ear daily.

An amplitude of above 3 mv. in the regeneration appeared in the electro-myograph after 50 days had elapsed since the operation finished in the case of the control, whereas the appearance in the case of the active substances (S) and (F) was faster by 16 and 8 days, respectively, thus indicating the promotive effect of regeneration of nerves.

Further, when the myelin formation was observed with a microscope, this formation appeared earliest in those administered the active substance (F), the formation being noted 14–18 days after the operation, when compared with the 30 days in the case of the control, therefore, the promotive effect of active substance (F) is clearly evident.

The active protein substances according to the present invention possess great affinity for the nervous system, and particularly the peripheral nerves, and it is clear that they have a unique biological activity such as their ability to promote the growth of neurons, the regeneration of the axons and/or proliferation of the glial cells as well as prevention of the degeneration of the cells.

ADMINISTRATION OF THE ACTIVE SUBSTANCES TO THE HUMAN BODY

It has been confirmed that there is no fear of developing deformity nor of taking place anaphylactic shocks by the use of the active protein substances of this invention. And when these substances are used for the treatment of disorders of the nervous system, pronounced therapeutic effects are noted.

The active protein substances of this invention are preferably administered to the human body by means of intramuscular injection. Although the dosage will vary depending upon the conditions of the illness and frequency of administration, usually a dose of from 1 mg. to 5 mg. per day is to be preferred. The frequency of administration can of course be varied over a wide range depending upon the conditions of illness, but generally administration of one to three times per week is to be preferred.

In administering the active protein substances of this invention, it is possible to make conjoint use of various chemical therapeutic preparations or nutritive preparations such as vitamins.

Typical clinical examples in which the active protein substances of this invention were administered to out-patients in neurology department are shown in Table IV, below. The dosage was 3 mg. per day, which was by intramuscular injection, the injections being made 1–3 times per week or daily excepting Sunday.

TABLE IV

The effect of the active substance on the paralysis of facial nerves

| Patent No. | Sex | Age | Location | Days after onset | Cause | Therapy before hospitalization | Result | Administration of active substance Amount | Administration of active substance Period | Conjointed drugs | Outcome (symptoms) |
|---|---|---|---|---|---|---|---|---|---|---|---|
| 1 | M | 31 | Left | 1 week | Drinking | Adrenocortical hormone; T.T.F.D. (vitamin B1) 300 mg.; hydroxocobalamine. | No change | 43A | 6 months | T.T.F.D. (vitamin B1) 75 mg.; hexanicit 3 tablets. | Disappeared. |
| 2 | M | 26 | Right | 5 days | Driving | | | 4A | 2 weeks | Salicylic acid prep | {Improvement. Disappeared. |
| 3 | F | 25 | Left | 1 week | | | | 7A | | | |
| | | | | | | | | 5A | 8 days | T.T.F.D. (vitamin B1) 75 mg.; hexanicit 3 tablets. | Disappeared. |
| 4 | F | 51 | Right | 10 days | Stomatitis | A.T.P. 10 mg.; T.T.D.F. 50 mg.; I–V | No change | 6A | 9 days | Salicylic acid prep | Disappeared. |
| 5 | F | 18 | Left | 1 week | | | | 7A | 2 weeks | T.T.F.D. (vitamin B1) 75 mg.; Salicylic acid Prep. | Disappeared. |
| 6 | F | 51 | Right | 7 months | Overexertion | T.T.F.D.; large amount hydroxocobalamine 30A | Partly disappeared | 23A | 2 months | | Disappeared. |
| 7 | F | 36 | Right | 5 years | Tuberculosis | T.T.F.D.; adrenocortical hormone; anabolic hormone; hydroxocobatamine; physical treatment. | No change | 30A | 2.5 months | | No change. |
| 8 | M | 27 | Right | 1 week | Drinking | T.T.F.D. 75 mg.; elestol 3 tablets; hexanicit 3 tabs | No change | 7A | 17 days | | Disappeared. |
| 9 | M | 32 | Right | 1 week | Wound | T.T.F.D. 75 mg.; elestol 3 tablets; salicylic acid prep. | No change | 8A | 3 weeks | | Disappeared. |
| 10 | M | 22 | Right | 1 week | | Uncertain 5A | | 5A | 2 weeks | | No change. |

TABLE IV.—Continued

The effect of the active substance on polyneuritis in hard recovery

| Patient No. | Sex | Age | Past anamnesis | Days after onset | Therapy in past | Symptoms | Administration of active substance | | Outcome (symptoms) |
|---|---|---|---|---|---|---|---|---|---|
| | | | | | | | Amount | Period | |
| 11 | M | 29 | Tonsillitis, nephritis | 2 years | Adrenocortical hormone; T.T.F.D. 100 mg.; salicylic acid prep. | Exhaustion; difficulty in step; edema; arthralgy. | 9A | 3 weeks | Partly disappeared. |
| 12 | M | 21 | Fracture of lower limb after childbirth | 1 year | Various vitamin B₁ prep. | Lumbago; exhaustion; sleeplessness | 15A | 1 month | No change. |
| 13 | F | 32 | | 6 months | Elestol; miosedan; bathing | Lumbago; arthralgy in knee and elbow; numbness. | 10A | 3 weeks | No change. |
| 14 | M | 51 | Beri-beri | | Orizanth-red (vitamin B₁); corset | Swelling in limbs; lumbago; difficulty in standing up. | 18A | 3 weeks | Disappeared. |

The effect of NGF on neuralgia and others

| Patient No. | Sex | Age | Past anamnesis | Days after onset | Therapy in past | Diagnosis | Symptoms | Administration of NGF | | Outcome (symptoms) |
|---|---|---|---|---|---|---|---|---|---|---|
| | | | | | | | | Amount | Period | |
| 15 | M | 50 | Convulsion of right facial nerve. | 1 month | T.T.F.D. 150 mg | Sciatic neuralgia | Hyperesthesia; paralysis | 11A | 3 months | Disappeared. |
| 16 | F | 50 | | 7 years | Balance 30 mg | Trigeminal neuralgia in right side. | Convulsion of eyelid; tenderness of second and lower limbs. | 6A | 2 weeks | Disappeared. |
| 17 | M | 18 | Paralysis of accommodation of facial nerve. | 1 month | T.T.F.D. 60 I.V. | Paralysis of accommodation | Double vision; difference between left and right on Westphal Pupille. | 12A | 4 weeks | Partly disappeared. |
| 18 | F | 54 | Beri-beri | 8 months | T.T.F.D. 200 mg.; hydroxocobalamine; adrenocortical hormone. | Nerve? Funicular myelosis? | Loss of lower limb power; difficulty in step; anemia; dizziness. | 10A | 3 weeks | No change. |

The effect of the active substance on hypertonic and diabetic nervous disturbances

| Patient No. | Sex | Age | Past anamnesis | Therapy in past | Symptoms | Blood sugar content | Diagnosis | Administration of active substance | | Outcome (symptoms) |
|---|---|---|---|---|---|---|---|---|---|---|
| | | | | | | | | Amount | Period | |
| 19 | M | 64 | Hypertension | Blood pressure reducing agent | Feeling of stiffness of left lower limb muscle | | Hypertonic nervous disturbances. | 4A | 2 weeks | No change. |
| 20 | F | 73 | Hypertension; urinary calculus. | Blood pressure reducing agent and a large amount of vitamin B₁ prep. | Facial pain in right side; difficulty in step | | do | 8A | 1 month | Partly disappeared. |
| 21 | F | 54 | Hypertension | do | Incomplete movement of right hand and fingers; numbness. | | | 4A | 2 weeks | No change. |
| 22 | F | | Diabetes | Insulin; hydroxocobalamin | Numbness in upper and lower limbs; thirst and dizziness; hypotension due to standing up. | 290 | | 7A | 3 weeks | No change. |
| 23 | M | 33 | Diabetes | ? | Numbness in left lower limb; sleeplessness; rachialgia; hyperstalosis. | 300 | | 5A | 10 days | Partly disappeared. |
| | | | | | | 264 | | | | |
| | | | | | | 210 | | | | |

The effect of the active substance on cerebrovascular diseases

| Patient No. | Sex | Age | Past anamnesis | Therapy in past | Diagnosis | Symptoms | Administration of active substance | | Outcome (Symptoms) |
|---|---|---|---|---|---|---|---|---|---|
| | | | | | | | Amount | Period | |
| 24 | F | 49 | Cerbral apoplexy | Blood pressure reducing agent | Incomplete cerebralvas | Dizziness; Hyperhydrosis; hindrance of sensibility; arhythmia; numbness in left lower limb. | 13A | 2 weeks | Partly disappeared. |
| 25 | M | 63 | Syphilis | | Brain syphilis | Hemiplegia (in right side); sleeplessness; dyslalia | 15A | 5 weeks | No change. |
| 26 | M | 60 | | | Paralysis of glossopharyngeal nerve | Difficulty in swallowing; incomplete sense of taste. | 20A | 1.5 months | No change. |
| 27 | M | 57 | Hypertension | Blood pressure reducing agent | Brain artheroselerosis | Amnesia; dizziness; dysbasia; lumbago | 5A | 3 weeks | Partly disappeared. |
| 28 | M | 65 | Artheriosclerosis | ? | Sensory distrubances after apoplexy | Spasmodic step | 20A | 1.5 months | No change. |
| 29 | M | 61 | | | Brain artherioselerosis | Pain in right lower limb; atrophy of the muscle; positive reaction in Lasegue's sign. | 11A | 1 month | No change. |

It is evident from the foregoing clincial examples that excellent effects such as the followings are obtained when the active protein substances of this invention have been administered; namely, (1) that excellent therapeutic effects are seen in the case of disorders of the nervous system, particularly disorders of the sensory nerves; (2) that the period required for the cure can be shortened greatly as compared with the hitherto-employed vitamins $B_1$ and $B_{12}$, nicontinic acid preparations, adrenocortical hormone and salicylic acid preparations; (3) that they may be used independently; (4) that there is observed a tendency to alleviation of the condition of illness with injections administered two or three times even in those cases where symptoms do not disappear, thus having remarkable effects in the initial stages of the illness; (5) that they are capable of being administered to patients of all ages; and (6) that the treatment period till disappearance of symptoms can also be shortened in the case of intoxications neuropathy.

Thus, when summarized, the present invention possesses such remarkable features in that it has found the presence in the sub-maxillary glands of the large animals, such as bovine, equine and swine, of protein substances which are biologically active with respect to the nervous system and has made possible the separation of said protein substances from the mucoid present in large quantities in said submaxillary glands, thereby providing a method of preparing said active protein substances in great quantities on a commercial scale without the need for any special operations or equipment.

Furthermore, the active protein substances obtained from the submaxillay glands of bovine, equine or swine in accordance with this invention have such advantages as that they possess great affinity for the nervous system, particularly the peripheral nerves, that they have effects which promote to a marked degree the growth of neurons, reinervation of the axon and proliferation of the glial cells, and that when they are administered intramuscularly to the human body, early therapeutic effects are observed in the case especially of disorders of the peripheral nerves.

This invention will be further illustrated by the following examples which are intended in an illustrative sense and not in limitation of the invention.

EXAMPLE 1

Submaxillary glands of bovine, swine or equine are removed of fatty and other tissues and then rubbed and ground. Extraction of the glands is carried out for 3 hours by adding a threefold amount of 2% saline to 1 kg. of each and maintaining pH 7.0–8.0 with NaOH. After separating the extraction solutions, an equal amount of 2% saline solution is added to the extraction residue and the extraction is repeated for one hour under identical conditions, following which the extraction solutions are separated and combined with the extraction solutions obtained first. To each of these extraction solutions is added a small amount of solid ammonium sulfate to obtain 0.5 saturation (24%), the pH then being adjusted to 7.0–7.5 with ammonia water in the case of extraction solution of bovine or equine, and to pH 4.0–4.5 with HCl in the case of the extraction solution of swine, after which the solutions are left standing in a refrigerator overnight. The deposited precipitates are centrifuged. To the clear mother liquors are further added solid ammonium sulfate to obtain 0.7 saturation (33%), and the pH is adjusted to 7.0–7.5 with ammonia water in the case of the bovine or equine solution and to 4.0–4.5 with HCl in the case of the swine solution, followed by standing in a refrigerator overnight. On the following day, a thin bed of Celite is made on a Buchner funnel and the deposited precipitates are separated by filtering the solution with suction. The precipitates remaining on the Buchner funnel are extracted twice along with the Celite with about 200 ml. of water. Then after combining the extraction solutions and submitting to dialysis against running water for 2–3 days, the red dialisand liquids within a dialyzing bag are centrifuged. After elimination of the small quantity of insoluble matter, they are then submitted to acetone fractionation.

To about 500 ml. of the clear liquids within a dialyzing bag, an equal amount of acetone is added with stirring under cooling condition to obtain a 50% concentration, the depositing precipitates being then collected by centrifuging. The precipitates, as obtained, are extracted and dissolved by adding thereto a 50-fold portion of 2% saline solution. Acetone is added to the nearly clear solutions with stirring under cooling condition to make 40% concentration. To the supernatant liquids obtained after removing the deposited precipitates, acetone is added in a similar manner to make 50% concentration. The precipitates which are formed between this 40 and 50% concentratives are collected by centrifuging, after which they are dehydrated with acetone and ether, and then dried to obtain the powder of active protein substances. The yield was about the same for bovine, swine or equine, being respectively 1–1.5 grams.

0.9% saline solution is added to these protein powders and the powders are dissolved to prepare solutions whose protein concentration is 2%. Acrinol aqueous solution prepared in advance is then added dropwise to the protein solutions with stirring under cooling condition until the concentration of 0.143% (ratio to the protein of 1:10) is obtained, followed by standing the solutions still for one hour in a refrigerator after adjusting the pH of the solutions to 9.5 with NaOH. The precipitates [active substance (F)] separating out are removed by centrifuging. The 0.5% acrinol solution is added in a similar manner to the supernatant liquids until the concentration of 0.186% (1:7) is obtained, after which the pH is adjusted to 9.5. Similar operations are repeated successively with acrinol concentrations of 0.222% (1:5) and 0.248% (1:4), the pH in both instances being adjusted to 9.5, and the depositing precipitates [active substance (F)] and separated to finally obtain 0.248% supernatant liquids.

A small quantity of active carbon or "Amberlite XE–64," which are washed in advance, are added to the foregoing liquid to adsorb the acrinol. Then when suction filtration is carried out in a Buchner funnel having a Celite bed provided thereon, there are obtained pinkish tinged clear filterates from which acrinol is completely eliminated. HCl is added dropwise to the filtrates to adjust the pH to 6.5–7.5, after which acetone is added with stirring under cooling condition, and the precipitates separating between 40 and 50% are collected by centrifuging. After disolving the precipitates in a small portion of water and dialyzing against distilled water, they are freezed and dried, whereby highly purified active substance (S) is obtained. The yield was about the same for bovine, swine and equine, being respectively 120–150 mg., 100–120 mg. and 150–200 mg.

The active substance (F) is obtained by collecting the aforesaid precipitates which were deposited by the addition of acrinol, extracting with a threefold portion of 1 M-ammonium acetate buffer solution (pH 9.5), adding a threefold portion of ethanol to the centrifugal upper layer liquids and depositing precipitates, dissolving these precipitates in 0.9% saline solution, followed by adding a threefold of acetone to the solutions and thereafter drying the separating precipitates. The yield of this purified active substance (F) was the same for bovine, swine and equine, being 500 mg. per kilogram of the glands.

EXAMPLE 2

Although the active substances (S) and (F) obtained in Example 1 having been purified to a high degree, as hereinabove described, their complete homogenization can be achieved by repeating the hereinafter described column chromatography.

First, either CM-cellulose or CM-sephadex is thoroughly washed in advance and then packed in a suitable column. An aqueous solution of the S-component or F-component is passed through this column and thereafter washed with water. The ineffective and colored component is eliminated by adsorption, while the respective active substances are contained in the unadsorbed effluent. Next, either DEAE-cellulose or DEAE-sephadex is thoroughly washed in advance, and a column buffered with a phosphoric acid buffer solution of pH 6.0 is prepared. The foregoing effluent of the S-component or F-component is passed through this column, followed by washing with 0.01 M phosphoric acid buffer solution of a pH 6.0. The respective active substance remain adsorbed to the column. The column is eluted successively with 0.01 M phosphoric acid buffer solution of pH 6.0 and effluents to which have been added NaCl in the amounts of 0.12 M and 0.5 M–0.75 M. The S-component is eluted from the column with the effluent of 0.12 M NaCl concentration, while the F-component is eluted from the column with effluent of 0.5–0.75 M NaCl concentration. A twofold portion of acetone is added to the respective effluents to deposit the respective precipitates, which are dissolved in a small portion of water and dialyzed to remove the salts which are admixed. This chromatography by means of DEAE-cellulose or DEAE-sephadex is repeated once more, and finally the S- and F-components are freezed and dried and thus homogeneous products of both are obtained.

The yield of the homogeneous S-component is 50–80 mg. per kg. of glands of all the foregoing animals, and that of the F-component is 200–300 mg.

EXAMPLE 3

Swine submaxillary glands are treated as in Example 1, after which the extraction of one kg. thereof is repeated twice, and then after combining the extraction solutions, solid ammonium sulfate is added until 0.5 saturation (24%) is obtained. After adjusting the pH of the solution to 6.5–7.0 by adding NaOH, acetone is added with vigorous stirring while being cooled until the concentration becomes 30%, whereupon mucoid clots begins to separate during the interim, and at the end point, the clots become completely separated from the solution and float. These mucoid clots are gathered and removed from the solution. The solution is then allowed to stand still in a refrigerator overnight, whereupon the solution separates into three layers. The active substances are contained in the bottommost layer which exhibits a red color. This bottom layer liquid is taken out by decantation, to which is then added solid ammonium sulfate until 0.7 saturation (33%) is obtained, after which it is adjusted to pH 4.0–4.5 and then allowed to stand overnight in a refrigerator. The following day, it is suction filtered as in Example 1 by preparing a thin bed of Celite above a Buckner funnel, after which the precipitate is extracted with water and dialyzed against running water, whereby is obtained a dialyzate solution containing the active substances of red color.

Thereafter, acetone fractionation is carried out as in Example 1 to obtain 1.5 grams of the powder of active substances. This powder is then purified by the acrinol fractionation method and the active substances (F) and (S) are separated. The yield was 100–20 mg., which was comparable to that of the swine gland in Example 1.

EXAMPLE 4

To extraction solutions obtained from the submaxillary glands of bovine, swine or equine, acetone is added by the procedure described in Example 1 until it becomes 50% by volume in the solutions, after which the solutions are allowed to stand overnight in a refrigerator. The depositing precipitates are taken out by means of centrifuging. The precipitates are then dissolved and extracted by adding a fourfold portion of 0.9% NaCl solution. Thereafter, by carrying out the ammonium sulfate fractionation, dialysis and acetone fractionation treatments as in Example 1, similar results were obtained.

EXAMPLE 5

Solid sodium sulfate is added to the extraction solutions obtained from the submaxillary glands of bovine, swine or equine by the procedure described in Example 1 until 0.5 saturation (15%) is obtained at 30° C., after which the pH is adjusted to 7.0–7.5 with ammonia water in the case of those bovine or equine and to 4.0 with HCl in the case of swine. The solutions are then allowed to stand overnight at 30° C. The mucoid precipitate separating out is removed by centrifuging, and to the clear mother liquors, is solid sodium sulfate further added at 30° C. until 0.7 saturation (22%) is obtained. The pH is adjusted to 7.0–7.5 in the case of those of bovine or equine and to 4.0 in the case of that of swine, following which the solutions are allowed to stand overnight at 30° C. The depositing precipitates are separated by suction filtration after which the precipitates are dissolved in a small portion of water and dialyzed against running water for 2–3 days. The hydrolyzate liquid within a dialyzing bag is then treated as in Example 1. Thus, purified active substances are obtained as in Example 1 and at near comparable yields.

EXAMPLE 6

To extraction solutions obtained from the submaxillary glands of bovine, swine or equine as in Example 1, are added 20% sodium sulfosalicylate aqueous solution which had been prepared by neutralizing with NaOH, the additions being in amounts $\frac{1}{10}$–$\frac{1}{20}$ until a concentration of roughly 1–2% is obtained. Next, the pH is adjusted to 3.0–4.0 by adding dropwise 20% HCl, then the solutions are allowed to stand in a refrigerator for 30–60 minutes, and thereafter centrifuging is conducted after adding a small amount of Celite. The upper layer liquid is discarded and a fourfold portion of water is added to the precipitates and extraction is carried out after adjusting the pH to 7–8 with NaOH. This is followed by filtration, whereby clear filtrates are obtained. The filtrates are treated with ion exchange resin to eliminate the sodium sulfosalicylate and thereafter acetone fractionation is carried out as in Example 1. Thus are obtained the active substances with yields and purities comparable to those obtained in Example 1.

EXAMPLE 7

Non fresh submaxillary glands of bovine, equine and swine which had been stored for the various periods of time indicated in Table V, below, are removed of their fatty and other tissues and rubbed and ground. To 1 kg. of each is added a threefold portion of 2% saline solution, and the extraction thereof is carried out for 3 hours while maintaining the pH between 7.0–8.0 with NaOH. After separating the extraction solution, 2% saline solution is added to the extraction residues in an equal amount and the extraction is repeated for 1 hour under identical conditions, after which the extraction solutions are separated and combined with their respective first extraction solutions. Separately, zinc chloride is dissolved in water to make a concentration of 0.1–0.2 mol, to 1 part of which solution are added 4 parts of acetone to prepare an aqueous acetone mixture containing zinc chloride. The zinc concentration of this mixed solution is 0.002–0.004 mol and its acetone concentration is 80%. This mixed acetone solution is added to the foregoing mixed extraction solutions in a ratio of 1 to 2, and without adjusting the pH the solutions are allowed to stand in a refrigerator overnight. The zinc concentration of these solutions is 0.0067–0.014 mol and the acetone concentration is 26.7%. On the following day, the deposited precipitates are separated by either centrifuging or by preparing a thin Celite bed on a Buchner funnel and suction filtering. These precipitates are dissolved by adding thereto a threefold portion of either 1.5% sodium citrate, 1% glycine or 1% EDTA solution, followed by filtering to eliminate the Celite and thereafter centrifuging, whereupon clear solutions containing the active substances are obtained. From these solutions, fractional precipitate is collected, as described in Example 1, under conditions with ammonium sulfate 0.5–0.7 saturation in neutral solution in the case of bovine or equine and similar fractional precipitate in a weakly acid in the case of swine. Then after dialysis, first precipitates are obtained by making acetone concentration 50% from the dialyzate solutions. When these precipitates in their state as-obtained are extracted with 2% saline solution and the precipitates which are separated out between 40–50% acetone concentration are dried, powders of crude active substances containing very little mucoid, whose purification process is easy, can be obtained. The results obtained are shown in Table V, below, to compare with the results obtained in Example 1.

5. The process of claim 3 wherein step (b) is conducted at approximately 50% saturation of said ammonium sulfate or sodium sulfate and step (d) is conducted at approximately 70% saturation of said ammonium sulfate or sodium sulfate.

6. The process of claim 3 wherein the precipitate collected in step (e) is subjected to further fractional precipitation comprising:
(f) dissolving the collected precipitate of step (e) in an aqueous medium to form an aqueous solution of said precipitate;
(g) subjecting the aqueous solution of (f) to fractional precipitation with acetone or an alcohol in a concentration in said aqueous solution of from 40% to 50%; and
(h) collecting the fractional precipitate of (g) containing the active protein substance.

7. A process for the recovery of protein substances having a biological activity to promote the growth and development of the nervous system by the fractional

TABLE V.—MUCOID CONTENTS OF CRUDE POWDERS EXTRACTED BY THE ZINC-ACETONE METHOD

| | Example 7 | | | | Example 1 | | |
|---|---|---|---|---|---|---|---|
| Storage period ($-25°$ C.) | Crude powder yield (per kg. of gland), g. | Content of reducing sugar in crude powder (percent) | Yield index of active substances in crude powder* | Crude powder yield (per kg. of gland), g. | Content of reducing sugar in crude powder (percent) | Yield index of active substances in crude powder | |
| 0 | 1–1.5 | 1–2 | 103 | 1–1.5 | 3–5 | 100 | |
| 2 weeks | 1–1.5 | 1–2 | 103 | 1–1.5 | 3–5 | 100 | |
| 1 month | 1–1.5 | 1–2 | 103 | 1–1.5 | 5–7 | 98 | |
| 2 months | 1–1.5 | 1–2 | 103 | | | | |
| 3 months | 1–1.2 | 2–3 | 82 | 0.8–1.2 | 10–12 | 74 | |
| 4 months | 0.8–1.2 | 2–3 | 82 | 0.8–1.2 | 15 | 72 | |
| 6 months | 0.8–1.2 | 2–3 | 82 | | | | |

*The yield index of the active substances is represented by a value calculated on a basis of a yield of 100 for that of zero day storage in Example 1.

What is claimed is:

1. A process for the recovery of protein substances having a biological activity to promote the growth and development of the nervous system by the fractional precipitation from animal gland extracts, which process comprises:
(a) extracting the submaxillary glands of large animals selected from the group consisting of bovine, equine, and swine with an aqueous extracting agent selected from the group consisting of water and saline solution;
(b) adding to the extracted solution of (a) sufficient ammonium sulfate or sodium sulfate to adjust the concentration to 50% to 70% saturation of said ammonium sulfate or sodium sulfate so as to fractionally precipitate an active protein substance within such range of concentration; and
(c) collecting the fractional precipitate of (b) containing the active protein substance.

2. The process of claim 1 wherein in step (b) the pH is adjusted to 7.0–7.5 in the case of bovine or equine or to 4.0–4.5 in the case of swine.

3. The process of claim 1 wherein the mother liquor resulting from the fractional precipitation in step (b) is subjected to further fractional precipitation comprising:
(d) adding to said mother liquor sufficient ammonium sulfate or sodium sulfate to adjust the concentration to 50% to 70% concentrated solution of said ammonium sulfate or sodium sulfate so as to fractionally precipitate an active protein substance within such range of concentration; and
(e) collecting the fractional precipitate of (d) containing the active protein substance.

4. The process of claim 3 wherein in step (d) the pH is adjusted to 7.0–7.5 in the case of bovine or equine or to 4.0–4.5 in the case of swine.

precipitation from animal gland extracts, which process comprises:
(a) extracting the submaxillary glands of large animals selected from the group consisting of bovine, equine, and swine with an aqueous extracting agent selected from the group consisting of water and saline solution;
(b) adding to the extracted solution of (a) ammonium sulfate or sodium sulfate in an amount sufficient to adjust the concentration to approximately 50% saturation, adjusting the pH of the solution to 7.0–7.5 in the case of bovine or equine, or to 4.0–4.5 in the case of swine, and removing the resulting precipitate therefrom;
(c) adding to the mother liquor ammonium sulfate or sodium sulfate in an amount sufficient to adjust the concentration to approximately 70% saturation, adjusting the pH of the liquor to 7.0–7.5 in the case of bovine or equine, or to 4.0–4.5 in the case of swine, and recovering the resulting precipitate therefrom;
(d) dissolving the collected precipitate of (c) in an aqueous medium; and
(e) subjecting the solution of (d) to fractional precipitation with acetone or alcohol in a concentration between 40% and 50%, and collecting the fractional precipitate containing a protein substance.

8. The process according to claim 7 wherein acetone is added to make the solution have an acetone concentration up to 30% in step (b).

9. A process for the recovery of protein substances having a biological activity to promote the growth and development of the nervous system by the fractional precipitation from animal gland extracts, which process comprises:
(a) extracting the submaxillary glands of large animals selected from the group consisting of bovine, equine, and swine with an aqueous extracting agent selected from the group consisting of water and saline solution;

(b) adding a water-soluble zinc salt selected from the group consisting of zinc chloride and zinc acetate to the extracted solution of (a) in an amount sufficient to prepare a solution in which the mol concentration of zinc is within the range of 0.0067–0.014 so as to fractionally precipitate the active protein substance within that mol concentration; and (c) recovering the resulting precipitate of (b) containing the active protein substance;

(d) dissolving the collected precipitate of (c) in an aqueous medium so as to form an aqueous solution thereof;

(e) adding to said aqueous solution of (d) sufficient ammonium sulfate or sodium sulfate to form 50% to 70% saturation of said ammonium sulfate or sodium sulfate so as to fractionally precipitate an active protein substance within such range of saturation; and (f) collecting the fractional precipitate of (g) containing the active protein substance.

10. The process of claim 9 wherein in step (e) the pH is adjusted to 7.0–7.5 in the case of bovine or equine or to 4.0–4.5 in the case of swine.

11. The process of claim 9 wherein the mother liquor resulting from the fractional precipitation in step (e) is subjected to further fractional precipitation comprising:

(g) adding to said mother liquor sufficient ammonium sulfate or sodium sulfate to adjust the concentration to 50% to 70% saturation of said ammonium sulfate or sodium sulfate so as to fractionally precipitate an active protein substance within such range of concentration; and (h) collecting the fractional precipitate of (g) containing the active protein substance.

12. The process of claim 11 wherein in step (g) the pH is adjusted to 7.0–7.5 in the case of bovine or equine or to 4.0–4.5 in the case of swine.

13. The process of claim 9 further comprising the steps:

(g) dissolving the collected precipitate of (f) in an aqueous solution;

(h) subjecting the aqueous solution of (g) to fractional precipitation with acetone or an alcohol in a concentration in said aqueous solution of from 40% to 50%; and (i) collecting the fractional precipitate of (h) containing the active protein substance.

14. The process of claim 13 wherein in step (e) the pH is adjusted to 7.0–7.5 in the case of bovine or equine or to 4.0–4.5 in the case of swine.

15. The process of claim 11 further comprises the steps:

(i) dissolving the collected precipitate of (h) in an aqueous solution;

(j) subjecting the aqueous solution of (i) to fractional precipitation with acetone or an alcohol in a concentration in said aqueous solution of from 40% to 50%; and (k) collecting the fractional precipitate of (j) containing the active protein substance.

16. The process of claim 15 wherein in step (g) the pH is adjusted to 7.0–7.5 in the case of bovine or equine or to 4.0–4.5 in the case of swine.

17. A process for the recovery of protein substances having a biological activity to promote the growth and development of the nervous system by the fractional precipitation from animal gland extracts, which process comprises:

(a) extracting the submaxillary glands of large animals selected from the group consisting of bovine, equine, and swine with an aqueous extracting agent selected from the group consisting of water and saline solution;

(b) adding a water-soluble zinc salt selected from the group consisting of zinc chloride and zinc acetate to the extracted solution of (a) in an amount sufficient to prepare a solution in which the mol concentration of zinc is within the range of 0.0067–0.014 so as to fractionally precipitate the active protein substances within that mol concentration, and recovering the resulting precipitate therefrom;

(c) dissolving the collected precipitate of (b) in an aqueous medium containing a dissociating agent;

(d) adding to the solution of (c) ammonium sulfate or sodium sulfate in an amount sufficient to adjust the concentration to approximately 50% saturation, adjusting the pH of the solution to 7.0–7.5 in the case of bovine or equine, or to 4.0–4.5 in the case of swine, and removing the resulting precipitate therefrom; and (e) adding to the mother liquor ammonium sulfate or sodium sulfate in an amount sufficient to adjust the concentration to approximately 70% saturation, adjusting the pH of the liquor to 7.0–7.5 in the case of bovine or equine, or to 4.0–4.5 in the case of swine, and recovering the resulting precipitate therefrom.

18. A process for the recovery of protein substances having a biological activity to promote the growth and development of the nervous system by the fractional precipitation from animal gland extracts, which process comprises:

(a) extracting the submaxillary glands of large animals selected from the group consisting of bovine, equine, and swine with an aqueous extracting agent selected from the group consisting of water and saline solution;

(b) adding to the extracted solution of (a) ammonium sulfate or sodium sulfate in an amount sufficient to adjust the concentration to approximately 50% saturation, adjusting the pH of the solution to 7.0–7.5 in the case of bovine or equine, or to 4.0–4.5 in the case of swine, and removing the resulting precipitate therefrom;

(c) dissolving the collected precipitate of (b) in an aqueous medium containing a dissociating agent; and (d) subjecting the solution of (e) to fractional precipitation with acetone or alcohol in a concentration between 40% and 50%, and collecting the fractional precipitate containing a protein substance.

19. A process for the recovery of protein substances having a biological activity to promote the growth and development of the nervous system by the fractional precipitation from animal gland extracts, which process comprises:

(a) extracting the submaxillary glands of large animals selected from the group consisting of bovine, equine, and swine with an aqueous extracting agent selected from the group consisting of water and saline solution;

(b) adding a water-soluble zinc salt selected from the group consisting of zinc chloride and zinc acetate to the extracted solution of (a) in an amount sufficient to prepare a solution in which the mol concentration of zinc is within the range of 0.0067–0.014 so as to fractionally precipitate the active protein substances within that mol concentration, and recovering the resulting precipitate therefrom;

(c) dissolving the collected precipitate of (b) in an aqueous medium containing a dissociating agent;

(d) adding to the extracted solution of (c) ammonium sulfate or sodium sulfate in an amount sufficient to adjust the concentration to approximately 50% saturation, adjusting the pH of the solution to 7.0–7.5 in the case of bovine or equine, or to 4.0–4.5 in the case of swine, and removing the resulting precipitate therefrom;

(e) adding to the mother liquor ammonium sulfate or sodium sulfate in an amount sufficient to adjust the concentration to approximately 70% saturation, adjusting the pH of the liquor to 7.0–7.5 in the case of bovine or equine, or to 4.0–4.5 in the case of swine, and recovering the resulting precipitate therefrom;

(f) subjecting the solution of (e) to fractional precipitation with acetone or alcohol in a concentration between 40% and 50%, and collecting the fractional precipitate containing a protein substance.

20. The process according to claim 7, wherein the collected precipitate resulting from step (e) is separated into (S) a mother liquor containing the protein substance effective in promoting the formation of myelines by dissolving the collected precipitate in an aqueous medium and adding incrementally thereto acrinol until the solution has an acrinol concentration of 0.248%.

21. The process according to claim 21, wherein the collected precipitate resulting from step (f) is separated into (S) a mother liquor containing the protein substance effective in promoting the growth of neurones and axons and (F) a precipitate consisting of an acrinol complex of the protein substance effective in promoting the formation of myelines by dissolving the collected precipitate in an aqueous medium and adding incrementally thereto acrinol until the solution has an acrinol concentration of 0.248%.

22. The product produced by the process of claim 1.
23. The product produced by the process of claim 4.
24. The product produced by the process of claim 7.
25. The product produced by the process of claim 20.
26. The product produced by the process of claim 21.

27. A process for the recovery of a protein substance effective in promoting the formation of myelins by the fractional precipitation from animal gland extracts, which process comprises:

(a) extracting the submaxillary glands of large animals selected from the group consisting of bovine, equine, and swine with saline solution;

(b) adding to the extracted solution of (a) ammonium sulfate or sodium sulfate to adjust its concentration to 0.5 saturation while adjusting the pH to 7.0–7.5 in the case of bovine or equine or to 4.0–4.5 in the case of swine, and separating and removing the resulting precipitate; adding to the mother liquor ammonium sulfate or sodium sulfate to adjust its concentration to 0.7 saturation and collecting the resulting precipitate containing the active protein subsance;

(c) dissolving the recovered precipitate in an aqueous medium, subjecting the solution to dialysis, then adding to the solution acetone or alcohol to adjust its concentration to 40%, and removing the resulting precipitate adding to the mother liquor acetone or alcohol to adjust its concentration to 50%, and recovering the resulting precipitate; and dissolving the precipitate in saline solution, adding to the solution an aqueous solution of acrinol to adjust the acrinol concentration to up to 0.248% and collecting the resulting precipitate.

28. A process for the recovery of a protein substance effective in promoting the growth of neurones and axons by the fractional precipitation from animal gland extracts, which process comprises:

(a) extracting the submaxillary glands of large animals selected from the group consisting of bovine, equine and swine with saline solution;

(b) adding to the extracted solution of (a) ammonium sulfate or sodium sulfate to adjust its concentration to 0.5 saturation while adjusting the pH to 7.0–7.5 in the case of bovine or equine or to 4.0–4.5 in the case of swine, and separating and removing the resulting precipitate;

(c) adding to the mother liquor ammonium sulfate or sodium sulfate to adjust its concentration to 0.7 saturation and collecting the resulting precipitate containing the active protein substance;

(d) dissolving the recovered precipitate in an aqueous medium, subjecting the solution to dialysis, then adding to the solution acetone or alcohol to adjust its concentration to 40%, and removing the resulting precipitate;

(e) adding to the mother liquor acetone or alcohol to adjust its concentration to 50%, and recovering the resulting precipitate;

(f) dissolving the precipitate in saline solution, adding to the solution an aqueous solution of acrinol to adjust the acrinol concentration to up to 0.248%, removing the resulting precipitate and then removing the acrinol from the mother liquor; and (g) thereafter adding acetone or alcohol to the mother liquor from which the acrinol has been removed, and recovering the precipitate formed while the acetone or alcohol concentration in the liquor is within a range of 40% to 50%.

References Cited

UNITED STATES PATENTS 3,178,349   4/1965   Ito et al.

OTHER REFERENCES

Annals of New York Academy of Sciences, vol. 85, 1960, Ito, pp. 228–229, 233–235, 265–272, 274 and 306.

Chem. Abstracts, vol. 54, 1960, Okabe, 11182c–g.

Chem. Abstracts, vol. 56, 1962, Ito et al., 11716e–f.

Chem. Abstracts, vol. 59, 1963, Teikoku Hormone, 6206f–h, 6207a–b.

Chem. Abstracts, vol. 64, 1966, Ito et al., 5540b–e— 1965 effective date.

Chem. Abstracts, vol. 65, 1966, Cassenne, 5308e–f, December 1965.

HAROLD D. ANDERSON, Primary Examiner

H. SCHAIN, Assistant Examiner

U.S. Cl. X.R.

424—177